United States Patent [19]
Underwood

[11] Patent Number: 5,806,175
[45] Date of Patent: Sep. 15, 1998

[54] CRIMP ASSEMBLY FOR CONNECTING AN OPTICAL FIBER RIBBON CORD TO A CONNECTOR

[75] Inventor: David T. Underwood, N. Richard Hills, Tex.

[73] Assignee: Siecor Corporation, Hickory, N.C.

[21] Appl. No.: 770,532

[22] Filed: Dec. 20, 1996

[51] Int. Cl.⁶ .................................................. H01R 43/04
[52] U.S. Cl. ............................... 29/748; 29/828; 29/861; 29/862; 385/87
[58] Field of Search .................................... 439/460, 585; 29/749, 863, 862, 750, 748, 758, 828, 861; 385/87

[56] References Cited

U.S. PATENT DOCUMENTS

| | | | |
|---|---|---|---|
| 3,644,874 | 2/1972 | Hutter | 439/585 X |
| 3,781,762 | 12/1973 | Quackenbush | 439/585 X |
| 4,135,776 | 1/1979 | Ailawadhi et al. | 439/585 X |
| 4,414,697 | 11/1983 | Hartley | 29/282 X |
| 4,684,201 | 8/1987 | Hutter | 439/585 |
| 5,141,451 | 8/1992 | Down | 439/585 |
| 5,274,903 | 1/1994 | Grois et al. | 29/566 |
| 5,338,225 | 8/1994 | Jacobsen et al. | 439/585 |
| 5,499,934 | 3/1996 | Jacobsen et al. | 439/585 |

OTHER PUBLICATIONS

US CONRC—"SIP2: Procedure for installing Conec® MT Push–on [MTP] multifiber connector on W.L. Gore's multimode ruggedized ribbon cord," dated May 27, 1994 [18 pages].

*Primary Examiner*—Peter Vo
*Assistant Examiner*—Rick Kiltae Chang

[57] ABSTRACT

A structure is provided for securing cable, which has internal working fibers and an external outer coat, to a terminal connector. Included in the structure is a crimp body which has an interior axial hole extending therethrough and an exterior surface with at least one groove and at least one ridge. The outer coat of the cable is placed around the exterior surface of the crimp body and a crimp ring is placed around the outer coat and the crimp body. The crimp ring is deformable and has an interior large enough to accommodate the crimp body and the outer coat. The crimp ring is deformable so that it can secure the outer coat between the crimp ring and the crimp body, with the groove and ridge arrangement of the crimp body further holding the outer coat in place.

9 Claims, 2 Drawing Sheets

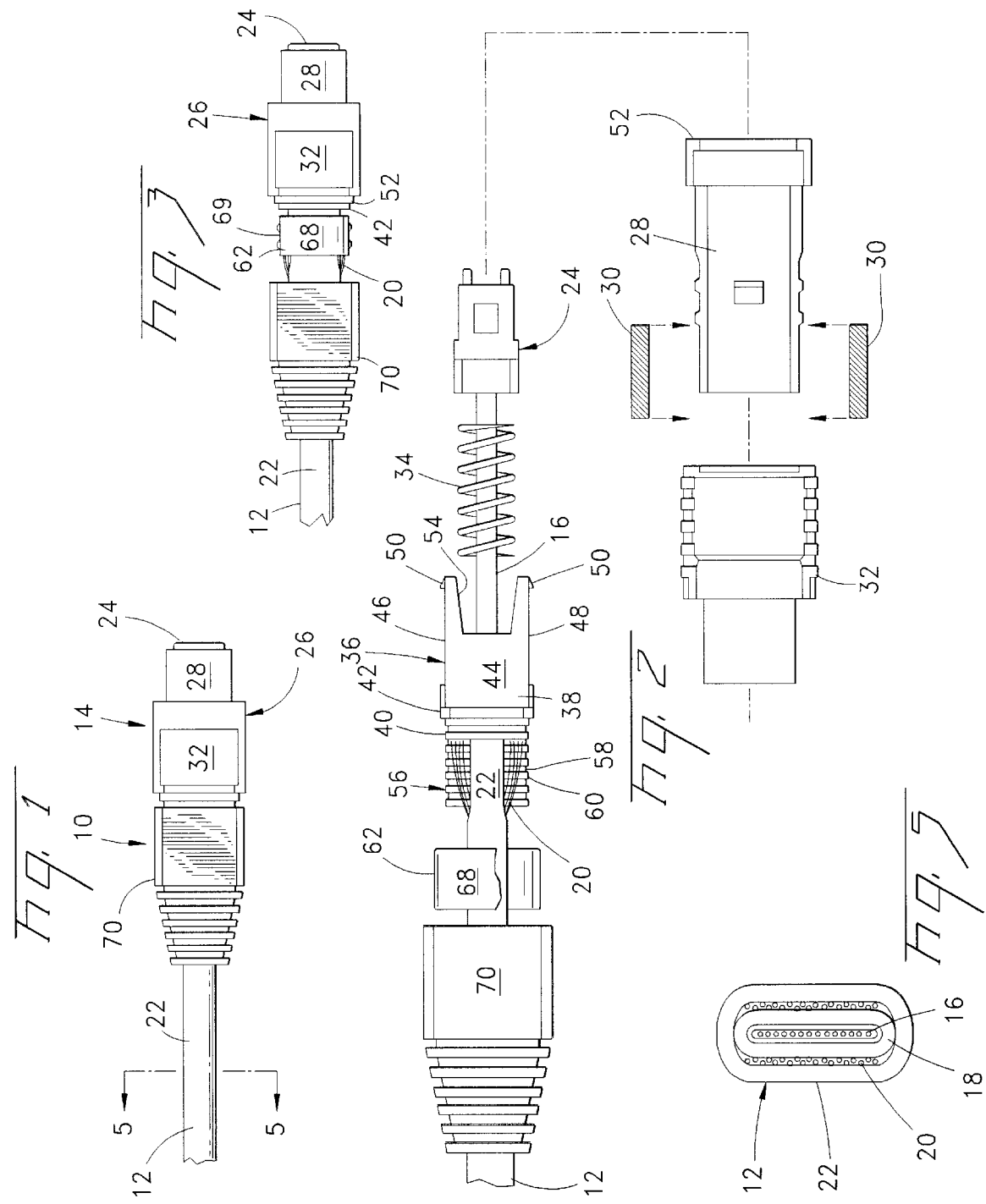

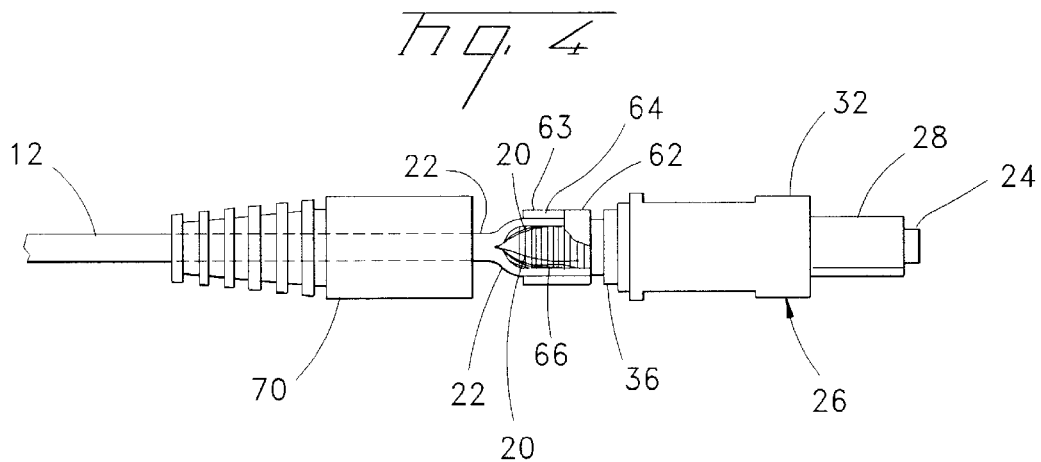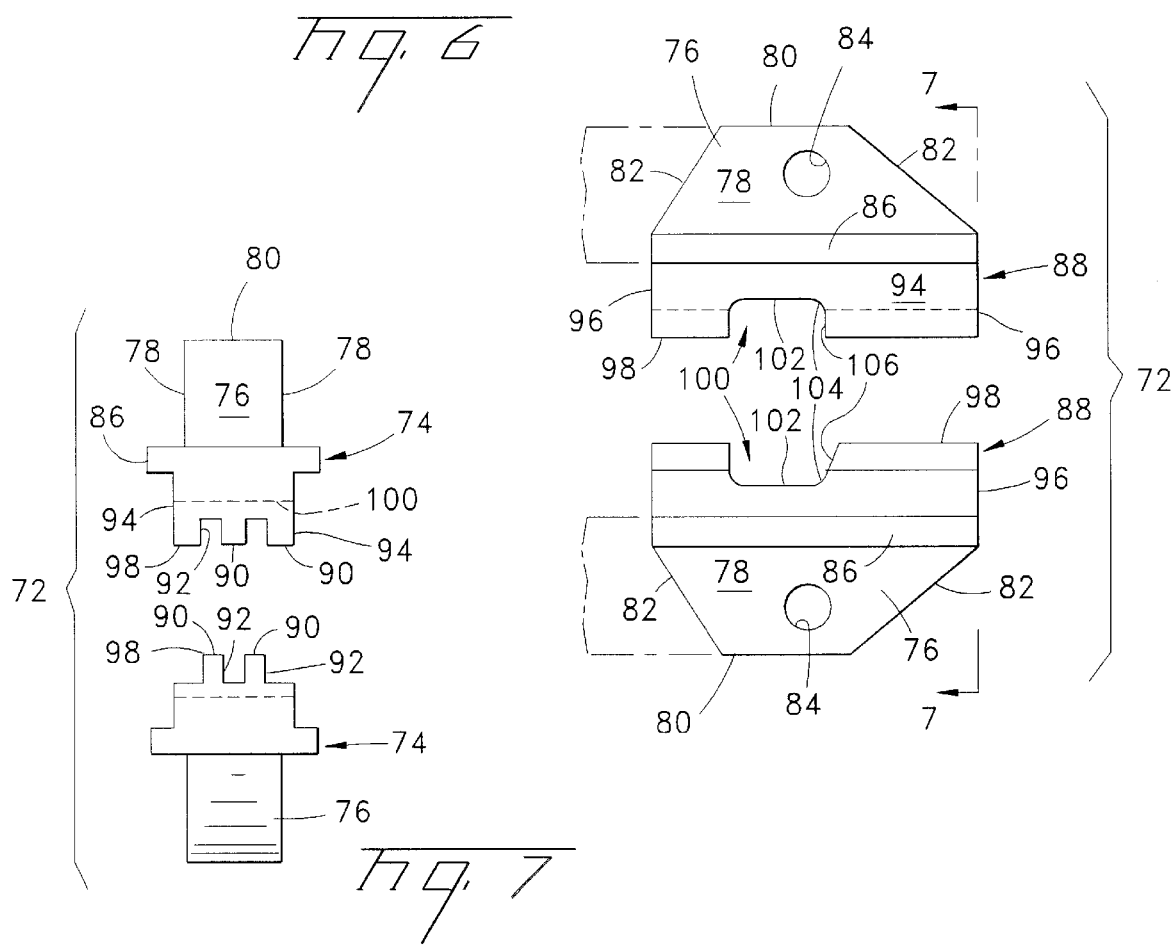

CRIMP ASSEMBLY FOR CONNECTING AN OPTICAL FIBER RIBBON CORD TO A CONNECTOR

BACKGROUND OF THE INVENTION

The present invention relates to a novel method and structure for securing a cable to a terminal connector. More particularly, the invention is directed to a method and structure for securing a ribbon optical cord to a connector.

Ribbon optical cords are currently widely used for a number of different applications in the communications industry. These ribbon optical cords have a central fiber, or series of fibers called a ribbon fiber, which are carriers of information. Surrounding the ribbon fiber is a protective acrylate primary fiber coating, which in turn is followed by a layer of strength fibers that are typically made of Kevlar. Surrounding the strength fibers is a protective outer coating. The ribbon cords are used to carry information of all kinds from one location to another. At each location, it is necessary to attach a terminal connector to the ribbon cord so that the information can properly be transferred from the ribbon fiber into a mating connector or communicating hardware. The ribbon fiber must therefore be reliably and sturdily connected to the terminal connector so that the information is preserved and properly transferred.

In the past, the ribbon cord has been attached to the terminal connector using an adhesive, such as epoxy. In this past method, a boot is first placed over the terminal end of the optical cord, followed by a connecting ring and a push spring connector. The outer coating is then removed from the end of the optical cord, while preserving the strength fibers lying there beneath. The exposed strength fibers are bent rearwardly so that the primary fiber coating is fully exposed and accessible. A given length of the primary fiber coating is then removed so that a given length of ribbon fiber is exposed. Thereafter, a spring and a rubber boot are placed over the exposed primary fiber coating. The rubber boot and the exposed ribbon fiber are then coupled with a ferrule using an epoxy resin. A connector pin-clamp is then attached to the ferrule assembly. The pin-clamp can be either male or female, depending on the orientation desired. The ferrule assembly is then inserted into and coupled with a connector assembly. Thereafter, the spring is inserted into the interior of the connector assembly and the push spring is then coupled to the connector assembly.

It is at this stage that the ribbon cord is secured to the connector assembly. In the past method, an adhesive is applied around the outer, rearward portion of the push spring. Before the adhesive has cured, the exposed strength fibers are spread over the push spring and into the adhesive. Thereafter, the connecting ring is inserted over the strength fibers and adhesive to surround the rearward end of the push spring. The adhesive thus secures the strength fibers of the ribbon cord to the connector assembly and the connector ring after the adhesive has set, or cured.

This method of coupling the ribbon cord to the connector suffers from a number of disadvantages. First, the process of using an adhesive is time consuming, because the ribbon cord will not be secured to the connector until the adhesive has had a sufficient amount of time to set. In past practice, the preferred epoxy resin used to secure the strength fibers to the connector assembly was STYCAST 2057, catalyst 9, available from Emerson & Cuming, Inc. One of the problems with this epoxy is that it takes about one day for it to cure. Therefore, the strength of the connection between the ribbon cord and the connector assembly cannot be adequately tested or used for at least one day.

Second, the adhesive used must be chemically compatible with the connector assembly and the materials used in the ribbon cord. The range of acceptable adhesives is therefore somewhat diminished. If an adhesive is used that is not chemically compatible with the connector and the materials of the ribbon optical cable, the strength and reliability of the connection therebetween may be of an unacceptable quality.

Further, in this past method and apparatus, only the strength fibers of the ribbon cord are secured to the connector. The protective outer coating is not used to connect the ribbon cord to the connector assembly. Thus, the strength of the connection is somewhat weaker than it otherwise might be if the outer coating could be incorporated into the connection between the ribbon cord and the connector.

An alternative method for coupling the connector to the ribbon cord is to crimp a connecting ring, having tabs, around the connector assembly. Once crimped, the connecting ring will generally be in the shape of a cardioid. In this method, therefore, the strength of the connection is reduced because the member that is crimped is equipped with strength reducing tabs. These tabs are needed to properly secure the crimped member around the ribbon cord and the connector but the crimp has the inherent possibility of opening slightly over time. In this method, therefore, the need for an adhesive is reduced but the strength of the connection is sacrificed.

Therefore, a method and a device are needed that can be used to reliably and sturdily connect a ribbon cord to a terminal connector. Further, a method and a device are needed that can be used to connect a ribbon cord to a terminal connector without the need for an adhesive. Still further, a method and device are needed that can be used to connect a ribbon cord to a connector while preserving the strength of the connection over time.

SUMMARY OF THE INVENTION

It is an object of the present invention to provide an apparatus that can be used to reliably and sturdily connect a ribbon cord to a connector without the need for an adhesive so that the assembly process is made less cumbersome and time consuming.

It is another object of this invention to provide an apparatus that can be used to connect the outer coating and strength fibers of the ribbon cord to the connector so that the quality of the connection is enhanced.

It is yet another object of this invention to provide an apparatus that can be used to connect a ribbon cord to a connector while maintaining the strength of the connecting member.

According to the present invention, the foregoing and other objects are obtained by a structure for securing cable, which has internal working fibers and an external outer coat, to a terminal connector. The structure includes a crimp body which is coupled to the terminal connector and which has an interior axial hole extending therethrough and an exterior surface with at least one groove and at least one ridge. The outer coat of the cable is placed around the exterior surface of the crimp body and a crimp ring is placed around the outer coat and the crimp body. The crimp ring has an interior large enough to accommodate the crimp body and the outer coat. Further, the crimp ring is deformable so that it can secure the outer coat between the crimp ring and the crimp body, with the groove and ridge arrangement of the crimp body further holding the outer coat in place. The deformation of the crimp ring is accomplished with a crimp tool which has a pair of mating jaws. The mating jaws are moved together to achieve the desired crimp.

In another embodiment of the present invention, a method is provided that can be used to secure a ribbon cord having internal fibers and a protective outer coat to a terminal connector. The method includes separating the outer coat from the internal fibers and placing the outer coat around the exterior surface of a crimp body. A deformable crimp ring is then moved into place around the outer coat and the crimp body, with the internal fibers being placed through an internal axial hole of the crimp body. Thereafter, the crimp ring is compressed with a crimp tool so that the outer coat is held securely in place between the crimp ring and the crimp body. Additional objects, advantages, and novel features of the invention will be set forth in part in the description which follows, and in part will become apparent to those skilled in the practice of the invention. The objects and advantages of the invention may be realized and attained by means of the instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a top elevation view of an assembled connecting structure according to the principles of the present invention, shown with a female ferrule assembly;

FIG. 2 is an exploded view of the connecting structure of FIG. 1, shown with a male ferrule assembly;

FIG. 3 is a top elevation view of the structure of FIG. 1, shown with the boot pulled away from the crimp ring;

FIG. 4 is a side elevation view of the structure of FIG. 3, with parts of the crimp ring being broken away to shown particular details of construction;

FIG. 5 is a cross sectional view of the ribbon cord, taken along line 5—5 of FIG. 1;

FIG. 6 is a side elevation view of the mating jaws of the crimp tool; and

FIG. 7 is a front elevation view of the mating jaws of the crimp tool taken along line 7—7 of FIG. 6.

DETAILED DESCRIPTION OF THE PREFERRED EMBODIMENTS

A connecting apparatus embodying the principles of this invention is broadly designated in the drawings by a reference numeral 10. Connecting apparatus at 10 is used to connect a ribbon cord 12 to a multifiber connector 14. Ribbon cord 12 is used to carry information from one location to another through one or more ribbon fibers 16. Ribbon fibers 16 are protected by an acrylate primary fiber coating 18. Running along the outside of primary coating 18 is a plurality of strength fibers 20, which are typically made of Kevlar. A flexible outer coat 22 surrounds strength fibers 20 and serves to protect fibers 16, primary coating 18 and strength fibers 20 from moisture, dust and other debris.

In order to properly transfer the information contained and running through ribbon fibers 16, it is necessary to connect ribbon cord 12 to multifiber connector 14 so that the information can be transferred into another ribbon cord 12 for further transportation, or into a piece of communications hardware. In the present invention, ribbon fibers 16 are connected to a ferrule assembly 24 as previously described and as is well known in the art. Ferrule assembly 24 can be of either male or female orientation, depending upon the orientation of the mating piece. Ferrule assembly 24 is surrounded by and held within a connector housing 26 which includes an inner-housing 28, a pair of springs 30, and an outer coupling 32. Connector housing 26, along with ferrule assembly 24 facilitates connecting ribbon fibers 16 to other ribbon fibers or a piece of communications hardware.

Placed behind ferrule assembly 24 within the interior of inner-housing 28 is a compression spring 34. As can best be seen in FIG. 2, ribbon fibers 16 extending from ferrule assembly 24 pass through the interior of compression spring 34. Disposed immediately behind compression spring 34 in connecting apparatus 10 is a spring push connector 36 which has a connecting body 38 and a crimp body 40 separated by a medial wall 42. Spring push connector 36 further has an axial hole (not shown) extending through the center thereof which allows passage of ribbon fibers 16 therethrough.

Connecting body 38 is used to couple spring push 36 with connector housing 26 and has an outer surface which includes a pair of sidewalls 44 (only one of which is shown in FIG. 2) along with a top wall 46 and a bottom wall 48. Side walls 44, top wall 46 and bottom wall 48 cooperate to form an outer surface that corresponds to an interior channel within inner housing 28. Extending outwardly from top wall 46 and bottom wall 48 are a pair of locking tabs 50 which prevent spring push connector 36 from axial movement once in place within connector housing 26. To assist locking tabs 50 in maintaining spring push connector 36 within inner housing 28, an adhesive may be applied to the outer surface of connecting body 38 prior to placing spring push connector 36 within the interior of inner housing 28. Spring push connector 36 is placed within inner housing 28 until medial wall 42 abuts a rear wall 52 of inner housing 28, as best been in FIGS. 2 and 3. Side walls 44 have formed therein a U-shaped relief 54 which acts to allow top wall 46 and bottom wall 48 to be deflected inwardly in amounts sufficient to allow locking tabs 50 to pass over a locking cam (not shown) which extends from the interior of inner housing 28.

Extending rearwardly away from medial wall 42 is crimp body 40. Crimp body 40 is preferably generally oval in shape, and has an exterior surface 56. Exterior surface 56 has formed therein an alternating series of grooves 58 and ridges 60 which operate to form a gripping surface as is more fully described below.

An additional component of connecting apparatus 10 is crimp ring 62, which is placed around crimp body 40 and which serves to couple ribbon cord 12 to spring push connector 36 as is more fully discussed below. Crimp ring 62 has a continuous wall 64 with an inner surface 66 and an outer surface 68. Prior to crimping, inner surface 66 defines an interior passage of generally oval shape, through which crimp body 40 will extend. Further, outer surface 68 will also be oval in shape and will be a generally smooth surface prior to crimping. The overall length of crimp ring 62 is slightly less than the length of crimp body 40 so that crimp body 40 will extend slightly beyond crimp ring 62 when crimp ring 62 is placed over crimp body 40. After crimping, inner surface 66 will cooperate with exterior surface 56 of crimp body 40 to hold ribbon cord 12 securely in place. As can best be seen in FIG. 3, crimp ring 62 is crimped around crimp body 40 and is deformed during crimping so that wall 64 has an alternating series of indentations 69 formed therein. Thus, after crimping, the interior passage defined by inner surface 66 will be smaller so that outer coat 22 and strength fibers 20 of ribbon cord 12 are held securely against crimp body 40. A boot 70 is placed over crimp body 40 and crimp ring 62 and is secured in place using an adhesive. Boot 70 protects the connection between ribbon cord 12 and spring push connector 36 from dust and debris.

In use, after ferrule assembly 24 and spring push connector 36 have been secured within connector housing 26, outer coat 22 and strength fibers 20 are placed around the outer surface 56 of crimp body 40. Thereafter, crimp ring 62 is placed around outer coat 22 and strength fibers 20. Crimp ring 62 is then crimped in place as is more fully discussed below. After crimping, crimp ring 62 will be deformed such that it has a series of alternating extensions and indentations in a location corresponding to top wall 48 and bottom wall 50. When crimp ring 62 has been crimped, outer coat 22 and strength fibers 20 are held securely in place against crimp body 40. The connection thus formed with crimp ring 62 is surrounded with boot 70 to protect the connection thereunder. Boot 70 is held in place with an adhesive or other suitable attaching means. At this stage, connecting apparatus 10 is ready for use. Specifically, it is not necessary to wait for an adhesive to cure before the outer coat 22 and strength fibers 20 are held in place on crimp body 40.

In order to properly deform crimp ring 62 about crimp body 40, a crimp tool 72 is used which acts to compress crimp ring 62 about crimp body 40 and thereby hold outer coat 22 and strength fibers 20 securely in place. Crimp tool 72 includes a pair of mating jaws 74 which are similar in many respects, with like parts of designated by like numerals. Each mating jaw 74 has a mounting block 76 which is formed by opposing vertical walls 78, top wall 80 and end walls 82. Ends walls 82 extend away from top wall 80 at an acute angle thereto. Disposed through mounting block 76 between vertical walls 78 is a mounting bore 84 which is used to couple mounting block 76 with the mechanism used to move mating jaws 74. Mounting bore 84 can thus be used to couple mating jaws 74 to a hand-held instrument or can alternatively be used to mount mating jaws 74 within automated machinery. Other methods of coupling mating jaws 74 to a crimping mechanism could be used and are well known within the art. Mounting block 76 terminates opposite top wall 80 at a strength support shoulder 86 which is formed integrally therewith. Shoulder 86 separates mounting block 76 from a crimping section 88 and adds structural support to mating jaws 74. Shoulder 86 extends outwardly from vertical walls 78 but is generally flush with end walls 82.

Crimping section 88 of mating jaws 74 is located on the side of shoulder 86 opposite mounting block 76 and provides the operative tooling to properly compress crimp ring 62 in place about crimp body 40. As best seen in FIG. 7, each crimping section 88 has formed therein a set of teeth 90 and notches 92 which are formed so that the teeth of one crimping section 88 mate with the notches 92 of the opposite crimping section 88. Teeth 90 and notches 92 are used to ensure proper alignment of mating jaws 74 during the crimping process as well as providing the necessary deformation of crimp ring 62. Each crimping section 88 has a pair of side walls 94 and end walls 96 which, along with a bottom surface 98, serve as the outer boundaries for crimping section 88.

Extending inwardly from bottom surface 98 from one side wall 94 to the other, in a location slightly offset from center, is a cavity 100 which is used to hold and crimp ring 62. Each cavity 100 has the same dimensions, so that each is a mirror image of the other. Cavity 100 extends inwardly from bottom surface 98 beyond the depth of notches 92 and is defined at is lowermost point by a flat 102. Flat 102 transitions via a radius 104 to angled walls 106, which preferably extend at an angle of 15 degrees from vertical. Further, cavity 100 is sized so that when crimp ring 62 is placed therein and mating jaws 74 are brought together, portions of crimp ring 62 will be deformed by teeth 90 and notches 92. Thus, teeth 90 and notches 92 form indentations 69 in crimp ring 62 as mating jaws 74 are brought together. Outer coat 22 and strength fibers 20 of ribbon cord 12 are thus held securely in place about crimp body 40 by crimp ring 62.

The method of the present invention involves sliding boot 70, crimp ring 62, spring push connector 36 and compression spring 34 over the terminal end of ribbon cord 12. A ferrule assembly 24 is then constructed and coupled with connector housing 26 as is well known in the art. Thereafter, spring 34 is placed within connector housing 26, and connector body 38 of spring push connector 36 is secured to connector housing 26, such as with an adhesive or other suitable attaching means. Each of these previous steps is accomplished using methods known to those of skill in the art.

After spring push 36 is secured to connector housing 26, it is necessary to couple ribbon cord 12 to the connector housing. In past methods, this was accomplished by adhesively securing only strength fibers 20 to the spring push connector. In the method of the present invention, the need for an adhesive is eliminated or greatly reduced. In this method, outer coat 22 and strength fibers 20 are separated from primary coating 18 and ribbon fibers 16 on the terminal end of ribbon cord 12 for a distance sufficient to extend slightly rearwardly of spring push connector 36. This separation is done prior to placing compression spring 34 about ribbon fibers 16, and subsequent to placing push spring 34 about ribbon cord 12. After spring push connector 36 has been secured to connector housing 26, the separated portion of strength fibers 20 and outer coat 22 are moved in place about crimp body 40, and crimp ring 62 is then moved in place about strength fibers 20 and outer coat 22. Therefore, both strength fibers 20 and outer coat 22 lie between crimp body 40 and crimp ring 62. Thereafter, crimp ring 62 is placed within cavity 100 of mating jaws 74, and mating jaws 74 are moved together. As mating jaws 74 are moved together, crimp ring 62 is compressed about crimp body 40 and is deformed by cavity 100 and teeth 90 and notches 92. Subsequent to crimping, wall 64 of crimp ring 62 is deformed, as best seen in FIG. 3. Thus, crimp ring 62 cooperates with grooves 58 and ridges 60 of crimp body 40 to securely hold outer coat 22 and strength fibers 20 therebetween.

As can be understood, when the more malleable crimp ring 62 is crimped about the rigid crimp body 40, inner surface 66 of crimp ring 62 is forced to undulate into grooves 58 and over ridges 60 of crimp body 40. As a result, the strength fiber 20 and outer coat 22 which are disposed between crimp body 40 and crimp ring 62 are captured along the undulating interface of inner surface 66 of crimp ring 62 and the grooves 58 and ridges 60 of the crimp body. This undulating capture of the strength fibers and outer coat contributes to increased retention of the strength fibers 20 and outer coat 20 which translates to an increase in strain relief at the connector. For example, were there to be an unintended axial force pulling ribbon cord 12 away from the connector when the connector was fixedly mated to a structure, such force would be relieved at the undulating capture of strength fibers 20 and outer coat 20 and would not be transferred through ribbon fibers 16 thus better protecting the interconnection of ribbon fibers in two connectors.

Additionally, with reference to FIG. 6, by the time flats 102 of jaws 88 begin acting on the outer surface of crimp ring 62, teeth 90 and notches 92 have interleaved such that the entire circumference of crimp ring 62 is bound. This prevents any "squeezing" of crimp ring radially outward such as might occur with other crimping tools that have jaws that do not interleave before compressive forces are exerted on a crimp ring. Such "squeezing" leaves a point of leverage on the outside of the crimp that renders it susceptible to coming open over time. In contrast, the interleaved jaws 88 force the crimp ring completely inward causing it to actually thicken and become stronger as it radially compresses.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

I claim:

1. Structure for securing an optical fiber ribbon cable having internal fibers in a planar array and an external outer coat, to a terminal connector, the structure comprising:

an oval crimp body having a cross-sectional area and an internal axial hole extending therethrough and an exterior surface with at least one ridge and at least one groove formed therein;

an oval deformable crimp ring having an opening extending therethrough, said opening being larger than said cross-sectional area of said crimp body;

wherein the internal fibers of the cable extend through said axial hole, the outer coat is split into a top half that extends over one side of said oval crimp body and a bottom half that extends over the other side of the oval crimp body, and said crimp ring surrounds the two halves of the outer coat;

wherein said crimp ring can be deformed to secure the halves of the outer coat between said crimp ring and said crimp body, the halves of the outer coat being held by said at least one ridge and said at least one groove of said crimp body.

2. The structure of claim 1, wherein said crimp ring is composed of a continuous and uninterrupted outer wall.

3. The structure of claim 2, wherein said cable has a plurality of strength fibers between the outer coat and the internal fibers, and wherein said strength fibers are secured between said crimp ring and said crimp body along with the outer coat.

4. The structure of claim 3, wherein said crimp body is formed integrally with a connector body.

5. The structure of claim 4, wherein said exterior surface of said crimp body is made up of a series of alternating ridges and grooves.

6. Structure for securing an optical fiber ribbon cable, having internal fibers in a planar array and an external outer coat, to a connector, the structure comprising:

an oval body having a cross-sectional area and an internal axial hold extending therethrough and a holding region with an exterior surface, said exterior surface having at least one ridge and at least one groove formed therein; and an oval deformable crimp ring for applying pressure to the outer coat in a direction perpendicular to said exterior surface;

wherein the internal fibers of the cable extend through said axial hole, the outer coat is split into a top half that extends over one side of said oval body and a bottom half that extends over the other side of the oval body, and said oval deformable crimp ring is placed over the halves of the outer coat;

wherein said holding means secures the halves of the outer coat between said oval deformable crimp ring and said body, the halves of the outer coat being held by said at least one ridge and said at least one groove of said body.

7. The structure of claim 6, wherein said cable has a plurality of strength fibers between the outer coat ad the internal fibers, and wherein said strength fibers are secured between said holding means and said body along with the outer coat.

8. The structure of claim 7 wherein said deformable crimp ring has an opening extending therethrough, said opening being larger than said cross-sectional area of said body.

9. The structure of claim 7, wherein said deformable crimp ring has a continuous, uninterrupted outer wall having an opening extending therethrough that is larger than said cross-sectional area of said body.

* * * * *